(12) United States Patent
Schmid

(10) Patent No.: US 9,705,168 B2
(45) Date of Patent: Jul. 11, 2017

(54) MOBILE ENERGY CARRIER AND ENERGY STORE

(71) Applicant: SIEMENS AKTIENGESELLSCHAFT, Munich (DE)

(72) Inventor: Günter Schmid, Hemhofen (DE)

(73) Assignee: SIEMENS AKTIENGESELLSCHAFT, Munich (DE)

(*) Notice: Subject to any disclaimer, the term of this patent is extended or adjusted under 35 U.S.C. 154(b) by 27 days.

(21) Appl. No.: 13/907,110

(22) Filed: May 31, 2013

(65) Prior Publication Data
US 2013/0260263 A1    Oct. 3, 2013

Related U.S. Application Data

(62) Division of application No. 12/737,360, filed as application No. PCT/EP2009/058081 on Jun. 29, 2009, now abandoned.

(30) Foreign Application Priority Data

Jul. 4, 2008    (DE) .................. 10 2008 031 437

(51) Int. Cl.
| | |
|---|---|
| C25C 3/02 | (2006.01) |
| C25C 3/04 | (2006.01) |
| C25C 3/06 | (2006.01) |
| C25C 3/34 | (2006.01) |
| H01M 14/00 | (2006.01) |
| C05C 1/00 | (2006.01) |
| C05C 3/00 | (2006.01) |
| H01M 4/38 | (2006.01) |
| H01M 6/02 | (2006.01) |
| C22B 26/12 | (2006.01) |

(52) U.S. Cl.
CPC ............ H01M 14/00 (2013.01); C05C 1/00 (2013.01); C05C 3/00 (2013.01); C25C 3/02 (2013.01); C25C 3/04 (2013.01); C25C 3/06 (2013.01); C25C 3/34 (2013.01); H01M 4/38 (2013.01); H01M 4/381 (2013.01); H01M 4/382 (2013.01); H01M 6/02 (2013.01); C22B 26/12 (2013.01); Y02P 20/133 (2015.11); Y02P 20/134 (2015.11)

(58) Field of Classification Search
CPC .... C01B 3/08; C25B 1/14; C25B 1/18; C25C 5/00; C25C 5/04; C25C 3/02; C25C 3/04; C25C 3/06; C25C 3/34
See application file for complete search history.

(56) References Cited

U.S. PATENT DOCUMENTS

| | | | | |
|---|---|---|---|---|
| 3,459,493 A * | 8/1969 | Ross | ................. | B01J 19/002 423/641 |
| 3,490,871 A * | 1/1970 | Miller | ................. | C01B 3/061 376/324 |
| 4,048,401 A | 9/1977 | Epstein et al. | | |
| 4,221,775 A * | 9/1980 | Anno | ................. | C01D 15/02 423/641 |
| 4,434,133 A * | 2/1984 | Down et al. | ................. | 376/323 |
| 4,723,962 A * | 2/1988 | Mehta | ................. | C01D 15/06 23/295 R |
| 4,988,417 A | 1/1991 | DeYoung | | |
| 5,219,550 A * | 6/1993 | Brown | ................. | C01D 15/08 423/179.5 |
| 5,491,037 A | 2/1996 | Kawakami | | |
| 5,505,930 A * | 4/1996 | Christiphine | ........... | C01B 3/042 423/179 |
| 6,432,584 B1 | 8/2002 | Visco et al. | | |
| 6,984,468 B2 | 1/2006 | Rubino et al. | | |
| 2006/0061672 A1 | 3/2006 | Nitta | | |
| 2006/0171869 A1* | 8/2006 | Anovitz | ................. | C01D 15/08 423/179.5 |
| 2006/0273757 A1 | 12/2006 | Naguib | | |
| 2007/0111099 A1 | 5/2007 | Nanjundaswamy et al. | | |
| 2007/0117007 A1 | 5/2007 | Visco et al. | | |
| 2008/0053513 A1 | 3/2008 | Palmer | | |
| 2010/0323253 A1* | 12/2010 | Fang et al. | ................. | 429/421 |
| 2011/0113844 A1 | 5/2011 | Schmid | | |

FOREIGN PATENT DOCUMENTS

| | | |
|---|---|---|
| CN | 1686784 | 10/2005 |
| DE | 4441859 | 9/1997 |
| DE | 69919712 | 2/2005 |
| DE | 102008031437 A1 | 1/2010 |
| EP | 1 633 009 A1 | 3/2006 |
| JP | 05258781 | 10/1993 |
| WO | 01/57943 A1 | 8/2001 |

OTHER PUBLICATIONS

Chinese Office Action issued Jul. 28, 2014 in corresponding Chinese Patent Application No. 200980125210.0.
Shang Fuliang et al; "Research Progress of Metal Hydrogen Storage"; State Key Lab of Advanced Technology for Materials Synthesis and Processing, Press of Rare Metal, vol. 25 Issue 2; pp. 8-13; 2006; CN; Feb. 28, 2006.
Element Displays, May 8, 2006, retrieved from http://www.theodoregray.com/periodictabledisplay/Eiements/003/index.s9. html; Dec. 17, 2012.

(Continued)

*Primary Examiner* — Wayne Langel
(74) *Attorney, Agent, or Firm* — Slayden Grubert Beard PLLC

(57) ABSTRACT

A mobile energy carrier with which energy in the form of materials from zones distributed widely throughout the world, for example with a large amount of solar energy, wind energy or other $CO_2$-neutral energy, for example the equator, can be transported to zones where there is a high energy requirement, for example Europe.

9 Claims, No Drawings

(56) References Cited

OTHER PUBLICATIONS

Tsukamoto, "Hermetically sealed lithium rechargeable batteries for high reliability applications: Medical, Aerospace and Other Specialties," 2002, IEEE pp. 129-132.
Yabe et al, "Demonstrated Fossil-Fuel-Free Energy Cycle Using Magnesium and Laser", Dec. 27, 2006, Appl. Phys. Lett. 89.
International Search Report for Application No. PCT/EP2009/058081; mailed Jan. 7, 2010.
U.S. Appl. No. 12/737,360, filed Jan. 4, 2011, Günter Schmid, Siemens Aktiengesellschaft.
Office Action dated Apr. 30, 2013 issued in copending U.S. Appl. No. 12/737,360.
Office Action dated Dec. 31, 2012 issued in copending U.S. Appl. No. 12/737,360.
Office Action dated Sep. 5, 2012 issued in copending U.S. Appl. No. 12/737,360.
Advisory Action dated Aug. 2, 2012 issued in copending U.S. Appl. No. 12/737,360.
Office Action dated Apr. 25, 2012 issued in copending U.S. Appl. No. 12/737,360.
Office Action dated Dec. 8, 2011 issued in copending U.S. Appl. No. 12/737,360.
Restriction Requirement dated Sep. 9, 2011 issued in copending U.S. Appl. No. 12/737,360.

* cited by examiner

MOBILE ENERGY CARRIER AND ENERGY STORE

CROSS REFERENCE TO RELATED APPLICATIONS

This application is a U.S. divisional application filed under 37 USC 1.53(b) claiming priority benefit of U.S. Ser. No. 12/737,360 filed in the United States on Jan. 4, 2011, which claims earlier to a National Stage Entry of International Application No. PCT/EP2009/058081, filed Jun. 29, 2009 claims the benefits of German Application No. 102008031437.4 filed on Jul. 4, 2008, these applications are incorporated by reference herein in their entirety.

BACKGROUND

Described below is a mobile energy carrier and energy store, by which energy can be transported in the form of material from zones distributed widely throughout the world, for example with a large amount of solar energy, wind energy or other $CO_2$ neutral energy, such as the equator, to zones with a high energy demand, for example Europe.

It is a general problem that energy is scarce and expensive, the worldwide oil reserves are limited, and the $CO_2$ emission from energy use must be controlled.

There is therefore always a requirement to create energy carriers which provide useable energy carriers, which are as $CO_2$ neutral as possible, in the industrial zones.

Some efforts have already been made to make the energy stored in naturally occurring rocks or sand usable beyond national boundaries. Particularly in conjunction with silicon extraction, trials have already been carried out to obtain energy from quartz or sand. This is done using compounds which are analogous to hydrocarbons and which have to be obtained chemically via a number of energy-intensive intermediate steps.

However, until now, this has always failed because of the negative energy balance which results when all the factors are considered, such as release of the energy contained therein, transport, etc.

SUMMARY

An aspect is therefore to provide a mobile energy carrier by which energy, for example in the form of solar energy, can be absorbed at the equator and can be released again in central Europe with a positive energy balance. However, the energy carrier can also be used to store excess energy in industrial countries.

An energy carrier may be in the form of elementary metal, wherein the metal is an electropositive metal. The use of an electropositive metal as an energy carrier and energy store is also described.

The expression energy carrier in the present case means a material which solves the stated problem, that is to say absorbs the $CO_2$ neutral and renewable energy all around the globe, can then transport it as cost-effectively as possible, and can release the stored energy again, at any time.

DETAILED DESCRIPTION OF THE PREFERRED EMBODIMENT

The energy carrier is suitable for being used directly in the form of primary electrochemical cells for electricity generation, by reaction with nitrogen in the air to produce fertilizers, and at the same time to produce thermal energy, and solely by combustion for energy production. The energy carrier resides well at the start of a possible energy chain.

The production of solar cells allows the direct conversion of sunlight to electrical energy. The energy carrier and energy store proposed for the first time here can be used to store photovoltaicly produced energy.

A metal is preferably used, which is available in adequate quantities. With a proportion of 0.006% of the earth's surface, the natural availability of lithium is comparable to that of copper and tungsten. In comparison to the other alkali metals and alkaline earth metals, lithium has advantages in terms of transport characteristics and the release of the energy. Further electropositive elements should also be mentioned, which can be considered as energy stores and energy carriers, such as zinc, magnesium, aluminum and/or the lanthanides, which likewise occur in a sufficient quantities and can be used as energy carrier here.

The metal is preferably a highly electropositive metal, which is also light in weight. Metals such as lithium are particularly suitable. With a density of 0.534 $g/cm^3$, lithium is the lightest of all the solid elements, after solid hydrogen.

Because of the special electron configuration of lithium in elementary form, this metal is the most electropositive of all, since the readiness to emit the single electron to the 2 s shell is very high. Lithium thus has the most negative potential of all of −3.045 volts.

Therefore, the energy storage cycle takes place as follows: first of all, the energy carrier lithium is produced from the naturally occurring lithium carbonate, and salts derived therefrom are produced by molten mass electrolysis.

It reacts strongly with water and air, but less strongly than the other alkali metals such as sodium and potassium.

It can accordingly preferably be transported in the form of solid bulk units such that there is as little surface area as possible for air and water to act on. Lithium can, for example, be melted by solar-thermal action, and can be pumped in liquid form. The energy carrier can be solidified for storage. This likewise applies to other alkali metals and, to a lesser extent, also to zinc.

An alternative transport form is also lithium hydride which is transported in solid form. It is also feasible to use other lithium derivatives, such as complex lithium compounds.

The reaction with water or oxygen in the air is primarily used to release the energy. The resultant hydroxides or oxides are once again fed back into the cycle.

The products which are created during the reaction with oxygen or water in the event of an accident are all water-soluble and neutralized by $CO_2$. In contrast to nuclear energy, there is therefore no need to expect any long-term damage to the environment.

Lithium is already used as an active material in negative electrodes. Because of the standard potential of approximately −3.5 volts for electrochemical cells (the most negative of all chemical elements, the high cell voltage which can be produced by, and the high theoretical capacity of 3.86 Ah/g make lithium an "ideal" negative electrode material (cathode material) for electrochemical cells. Electrical energy can thus be obtained in primary electrochemical cells, for example in conjunction with an air anode.

The use of lithium is described by way of example, which has advantages in use of the proposed mobile energy carrier in comparison to the prior art, for example energy obtained from oil.

Lithium can be produced electrochemically from naturally occurring rocks or waste products from sodium-potassium salt processing (in the form of the carbonate) by electrolysis, in particular by melt electrolysis. Lithium hydride can be produced directly from the elements by a solar-thermal reaction at an increased temperature.

All types of renewable energies can be used for electrolysis. In particular, wind energy, solar energy, biogas energy or overproduction from nuclear power stations can be used to obtain the pure lithium in elementary form.

The lithium is transported in the form of the pure metal or in the form of the hydride. In this case, precautionary measures are required, although, for example, the metal can be carried in double-hulled ships for sea transportation, in which the environmental risks of transport are less than those in the case of oil transportation, because all the reaction products with water or oxygen in the air with lithium are water-soluble.

Lithium (0.54 g/cm$^3$) or lithium hydride (0.76 g/cm$^3$) have a considerably lower density than water. Ships or containers which are loaded with the energy store are therefore unsinkable. This also applies to a restricted extent to the other alkali metals.

By way of example, for loading and unloading, the lithium metal, which has a comparatively low melting point of about 180° C. can be pumped. Lithium has the widest liquid range of all alkali metals.

In the form of the pure metal or of the metal hydride, the electropositive metals such as lithium and their homologous metals sodium, potassium as well as zinc, aluminum, magnesium and the lanthanides, can accordingly be used as energy carriers.

It is therefore proposed that elementary metal such as lithium or lithium hydride be produced using renewable energy at suitable points throughout the world, and that the metal then be transported in suitable containers, which, for example, are hermetically sealed against air and oxygen, to Europe or to other energy-consuming zones, where the potential energy stored in the metal or metal hydride can be released in an environmentally neutral manner by reaction with oxygen ("combustion") or with water.

The thermal energy which is released during combustion of lithium is −599.1 kJ/mol or −143.1 kcal/mol or −20.4 kcal/g and is approximately three times as great as that of coal.

However, in contrast to coal, no off-gas problem will occur from lithium combustion, since lithium quantitatively burns to form the oxide, which need not be stored but from which the metal is obtained in pure form after again being suitably transported to a suitable point in the world.

Even more energy is released when the metal reacts with water. The resultant waste product is lithium hydroxide, which can likewise be used as a raw material for obtaining lithium, in the same way as the oxide which is obtained from burning.

A further important advantage of lithium as an energy store is direct access to the production of fertilizers, which are essential for supplying the population of the world with food. It could likewise be used, although with low efficiency, for obtaining bio gas.

In this case, lithium reacts directly with oxygen in the air to form lithium nitride. The reaction takes place slowly, even at room temperature, but can be controlled by increasing the temperature. Following this, lithium nitride reacts with water to form ammonia and lithium hydroxide. Ammonia represents one of the most important sources of nitrogen for the chemical industry. Large amounts of ammonia are used for the production of fertilizers. In the process, large amounts of thermal energy are released. Ammonia can be burnt using the Ostwald process. The nitric acid which is created in this case is neutralized by ammonia. The resultant ammonium nitrate can be used directly for agriculture.

The use of lithium as an energy carrier and energy store therefore allows fertilizers to be produced without use of fossil fuels. In this case, solar energy is stored in a high-quality fertilizer. Lithium acts as the mediator.

A primary electrochemical cell is an energy store, for example an electrochemical element, in which the stored energy is immediately available and which—in contrast the secondary electrochemical cells—so-called rechargeable batteries, can in principle not be charged again.

Proposed is the use of an electropositive metal, in particular lithium, to solve the general energy problem. In this context, it has surprisingly been found that lithium is actually more suitable for the transport of energy, with considerably reduced risks to the environment than crude oil because of its lightness, its extreme normal potential and its wide liquid range. This is particularly because lithium forms water-soluble products when it reacts with water or oxygen which, once they have reacted, can be neutralized with $CO_2$ (1 g LiOH reacts with 450 ml of $CO_2$). In addition, lithium is used to fix nitrogen in the air, in order to make it useable for biological cycles, for example in the fertilizer industry.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide v. DIRECTV*, 358 F3d 870, 69 USPQ2d 1865 (Fed. Cir. 2004).

What is claimed is:

1. A method for energy transport and/or energy storage, comprising:
    collecting electrical electricity from at least one of sun, wind, biogas, or a nuclear power station;
    producing an elementary metal from a naturally occurring solid metal carbonate by a method including an electrolysis process, wherein the electrical energy collected from the at least one of sun, wind, biogas, or a nuclear power station is used for the electrolysis process;
    wherein the produced elementary metal is an electropositive metal, such that at least a portion of the electrical energy used for the electrolysis process is stored in the electropositive metal as electrical potential;
    converting the electropositive elementary metal from a first form having a first total surface area to a second form having a second total surface area less than the first total surface area;
    transporting the electropositive elementary metal in the second form to another location; and
    after transporting the electropositive elementary metal, releasing the electrical energy stored in the electropositive elementary metal as electrical potential by reacting the electropositive elementary metal with at least one of water or oxygen.

2. The method as claimed in claim 1, wherein the elementary metal is lithium.

3. The method as claimed in claim 1, wherein the electrical energy is collected from at least one of sun, wind, or biogas.

4. The method as claimed in claim 1, wherein the elementary metal is produced using electrolysis, wherein the electrical electricity collected from the renewable energy source is used for the electrolysis.

5. The method as claimed in claim 4, wherein the electrolysis is molten mass electrolysis.

6. The method as claimed in claim 1, wherein the electrical energy is stored in the elementary metal at a first global position, and the stored electrical energy remains usable after transportation of the elementary metal with the stored electrical energy to a second global position different from the first global position.

7. The method as claimed in claim 1, wherein the second form of the elementary metal comprises liquid or solid lithium or liquid or solid lithium hydride.

8. The method as claimed in claim 1, wherein the elementary metal is selected from the group consisting of zinc, magnesium, aluminum, and a lanthanide group metal.

9. The method as claimed in claim 1, wherein the elementary metal is formed from lithium compounds.

* * * * *